Nov. 23, 1965    C. B. FITES    3,218,796
FRICTION DEVICE OPERATING MECHANISM
Filed April 18, 1962

INVENTOR
CYRIL B. FITES
BY Gravely, Lieder & Woodruff
ATTORNEY

United States Patent Office 3,218,796
Patented Nov. 23, 1965

3,218,796
FRICTION DEVICE OPERATING MECHANISM
Cyril B. Fites, St. John, Mo., assignor to Wagner Electric Corporation, St. Louis, Mo., a corporation of Delaware
Filed Apr. 18, 1962, Ser. No. 188,336
5 Claims. (Cl. 60—7)

This invention relates to friction device operating mechanisms and in particular to those having releasable emergency friction device operating means therein.

The principal object of the present invention is to provide a friction device operating mechanism having service actuating means for friction device energization purposes under normal operating conditions when the vehicle system fluid pressure is above a predetermined amount and emergency actuating means for friction device energization purposes under emergency conditions when the vehicle system fluid pressure is reduced below the predetermined amount, said emergency actuating means being releasable for friction device de-energization purposes without re-establishing the vehicle system fluid pressure above the predetermined amount.

Another object of the present invention is to provide a friction device operating mechanism having service actuating means and emergency actuating means for friction device energization purposes and emergency release means operatively connected with said emergency actuating means to overcome the emergency function thereof.

And still another object of the present invention is to provide a friction device operating mechanism having emergency release means which are not shock-loaded upon the initiation of the emergency function of said friction device operating mechanism.

These and other objects and advantages will become apparent hereinafter.

Briefly, the invention embodies a source of fluid pressure, service means for energizing a friction device in response to applied fluid pressure from said source, emergency means for energizing said friction device when the fluid pressure of said source is decreased below a predetermined amount, and means operatively connected with said emergency means for de-energizing said friction device.

Figure 1:
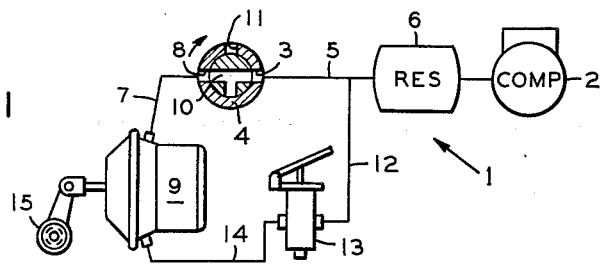
Figure 2:
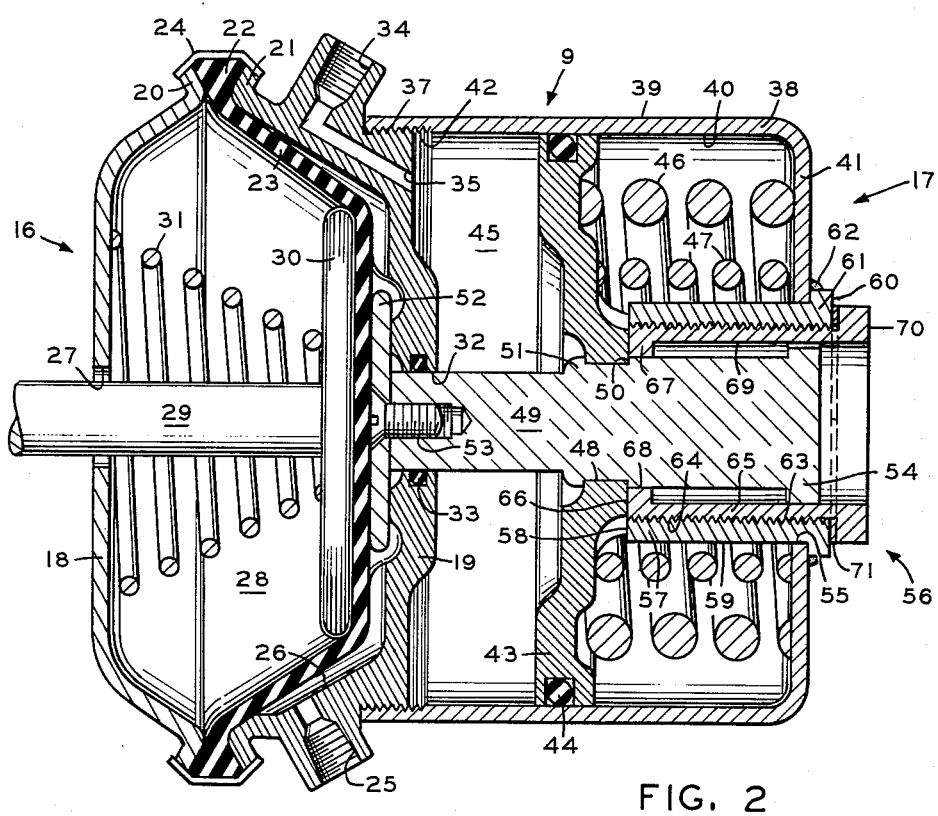
Figure 3:
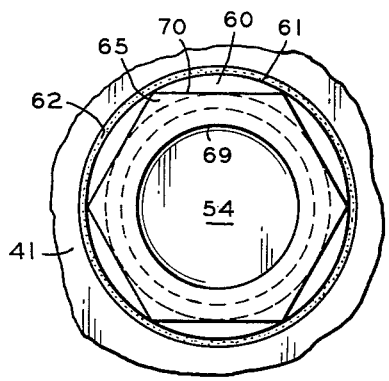

The invention also consists in the parts and arrangements and combination of parts hereinafter described and claimed. In the accompanying drawing which forms a part of the specification and wherein like numerals refer to like parts wherever they occur:

FIG. 1 is a diagrammatic view of an actuating system for a friction device with the friction device operating mechanism embodying the present invention shown therein, FIG. 2 is a greatly enlarged cross-sectional view of the friction device operating mechanism shown in FIG. 1, and FIG. 3 is a fragmentary right-end view of the friction device operating mechanism shown in FIG. 2.

Referring now to FIG. 1 in detail, a friction device actuating system, indicated generally at 1, is provided with fluid pressure generating means, such as an air compressor 2, which is connected to an inlet 3 of a charging or control valve 4 by a conduit 5 having a fluid pressure storage reservoir 6 interposed therein, and another conduit 7 is interposed between an outlet 8 of said charging valve and the emergency port of a friction device operating mechanism or actuating cylinder 9. The charging valve 4 is provided with passage means 10 connecting the inlet 3 in pressure fluid communication with the outlet 8; however, said charging valve can be rotated clockwise (in the direction of the arrow) positioning said passage means 10 to interrupt pressure fluid communication between said inlet and outlet and establish pressure fluid communication between said outlet and an exhaust port 11 to vent said outlet to atmosphere. A conduit 12 has one end intersecting with the conduit 5 and the other end thereof connecting with the inlet side of an application or control valve 13, and another conduit or service line 14 is interposed between the service or outlet side of said application valve and the service port of the actuating cylinder 9. To complete the system, the push rod of the friction device operating means or actuating cylinder 9 is pivotally connected with actuating lever or linkage means, such as slack adjuster 15, of a friction device (not shown).

The actuating cylinder 9, FIG. 2, is provided with a service portion and an emergency portion, indicated generally at 16 and 17, respectively. The service portion 16 is provided with opposed, concave-shaped housings 18 and 19 having opposed peripheral flanges 20 and 21, respectively, and a peripheral bead 22 integrally formed on a diaphragm 23 is maintained in sealable abutting engagement between the flanges 20 and 21 by the compressive force or a conventional clamping band 24 positioned in clamping engagement with said flanges. A service port 25 which receives the conduit 14, as previously mentioned, is provided in the housing 19 and connects with an expansible service or application chamber 26 formed between one side of the diaphragm 23 and the housing 19, and a centrally located aperture 27 is provided in the housing 18 connecting with an atmospheric chamber 28 formed between the housing 18 and the other side of said diaphragm. A push rod 29 extends coaxially through the aperture 27 having an exterior or working end operatively connected with the slack adjuster 15, as previously mentioned, and the interior end thereof carries a disc 30, said disc being normally biased into abutment with the diaphragm 23 and said diaphragm being normally biased into abutment with the housing 19 by the compressive force of a return spring 31 interposed between the housing 18 and said disc. The housing 19 is provided with a centrally located bore or aperture 32 having an O-ring 33 positioned therein (to be discussed hereinafter), and an emergency or control port 34 which receives the conduit 7, as previously mentioned, connects with one end of a passage 35 while the other end of said passage intersects with the endwall of the housing 19 exteriorly of the service chamber 26. The housing 19 is also provided with peripheral threads 37 adjacent the rightward end thereof.

The emergency portion 17 of the actuating cylinder 9 is provided with a cup-shaped housing or cylinder 38 having an annular sidewall portion 39 with a bore 40 therein and a radially extending base wall 41 integrally formed with said sidewall portion, and said bore is provided with internal threads 42 adjacent the free end of said sidewall portion for threaded engagement with the cooperating peripheral threads 37 on the housing 19. An emergency piston 43 is slidably positioned in the bore 40 and carries an O-ring 44 in sealable engagement with said bore. An expansible emergency chamber 45 is formed in the bore 40 between the housing 19 and the emergency piston 43 and is in open pressure fluid communication with the passage 35 and emergency port 34 in the housing 19 at all times, and a pair of oppositely wound emergency springs 46 and 47 are concentrically positioned in the bore 40 between said emergency piston and the base wall 41 of the housing 38 normally urging said emergency piston toward abutting engagement with the housing 19.

The emergency piston 43 is provided with a centrally located aperture 48 which receives an emergency shaft or piston extension 49 having a shoulder 50 formed near the mid-portion thereof. The emergency piston 43 is fixedly and sealably positioned in abutment with the shoulder 50 by suitable means, such as staking at 51. The leftward or working end of the piston extension 49 is positioned in the actuating chamber 26, and said piston extension is slidably received in the bore 32 of the housing 19 in sealing engagement with the O-ring 33. An abutment plate or disc 52 is attached to the leftward end of the piston extension 49 by suitable means, such as screw 53, and said abutment plate is normally abuttingly engaged between the diaphragm 23 and the housing 19. The rightward or abutment end of the piston extension 49 is provided with a radially extending abutment shoulder or collar 54 (to be discussed hereinafter).

Referring now to FIGS. 2 and 3, the base wall 41 of the housing 38 is provided with a centrally located aperture 55 therein to receive emergency release means, indicated generally at 56. The emergency release means 56 is provided with a sleeve or cylinder member 57 having an interior free end 58 extending coaxially into the bore 40 and a peripheral surface 59 received in the base wall aperture 55. The cylinder member 57 is also provided with an opposed exterior end 60 having a radially extending flange 61 integrally formed therewith externally of the bore 40, said flange being fixedly attached to the base wall 41 by suitable means, such as weld 62. A threaded bore 63 is axially provided through the cylinder 57 between the opposed interior and exterior ends 58 and 60 thereof to cooperatively receive a threaded peripheral surface 64 of a driving or release member 65. The driving member 65 is provided with an interior free end 66 which is coextensive with the cylinder interior end 58, and a radially inwardly extending abutment flange 67 is integrally provided on the driving member interior end 66. An axial bore 68 is provided through the flange 67, and said bore slidably receives the portion of the piston extension 49 between the shoulder 50 and collar 54. The driving member 65 also is provided with an axially extending counterbore 69 which slidably receives the collar 54 and which extends through an exterior free end 70 of said driving member wherein the abutment flange 67 and the collar 54 form a lost motion connection between the driving member 65 and the piston extension 49. The stroking distance of the collar 54 relative to the abutment flange 67 is predeterminately greater than the stroking distance of the emergency piston 43 to prevent shock loading of the threaded engagement between the release member 65 and the cylindrical extension 57 upon the emergency application or function of the emergency piston (to be discussed hereinafter). A hexagonally-shaped, radially outwardly extending head or flange 71 is integrally formed on the driving member exterior end 70, and a lockwasher or gasket 72 is received on the driving member peripheral surface 64 in locking engagement between the cylinder external end 60 and the flange 71.

In the operation with the component parts of the actuating cylinder 9 positioned as above described, assume that normal operating conditions exist wherein the storage reservoir 6 is charged with fluid pressure above a predetermined amount from the compressor 2, and said reservoir is connected in fluid pressure communication with the emergency chamber 45 through the passage 35 and emergency port 34 of the housing 19, the conduit 7, the outlet 8 of the control valve 4, passage means 10 and inlet 3, and the conduit 5. The fluid pressure so transmitted to the emergency chamber 45 acts on the effective area of the emergency piston 43 creating an emergency force to position said emergency piston in abutment with the interior end 66 of the cylinder 57 and to overcome the compressive force of springs 46 and 47 maintaining said springs their compressed position. With the component parts of the actuating cylinder 9 positioned as above described and as shown in the drawing, the friction device (not shown) is de-energized.

If the operator desires to make a normal service application to energize the friction device and effect deceleration or a complete stop, a manual force applied on the application valve 13 meters fluid pressure from the reservoir 6 through the conduits 5 and 12, said application valve, the service line 14, the service port 25 of the actuating cylinder 9, and into the service chamber 26. The fluid pressure so established in the service chamber 26 acts on the effective area of the diaphragm 23 creating a service force to move said diaphragm, the plate 30 and push rod 29 leftwardly against the return spring 31 actuating the working end of said push rod to rotate the slack adjuster 15 and energize the friction device. When the applied force is removed from the application valve 13, the fluid pressure is exhausted to atmosphere from the service chamber 26 through the service port 25, the conduit 14 and the exhaust port of the application valve 13 to eliminate the service force, and the compressive force of the return spring 31 moves the slack adjuster 15, the push rod 29 and plate 20, and the diaphragm 23 to their original positions.

In an emergency condition when the fluid pressure in the reservoir is reduced below the predetermined amount due to leaks in the system 1 or a non-producing compressor 2, or the like, the fluid pressure in the emergency chamber 45 is correspondingly reduced thereby reducing the emergency force opposing the compressive forces of emergency springs 46 and 47. When the magnitude of the spring forces overcomes the reduced emergency force, emergency springs 46 and 47 move the emergency piston 43 leftwardly in the bore 40 into abutment with the housing 19, and the shaft 49 is concertly moved with said emergency piston to actuate the leftward end thereof in a work producing direction in the actuating chamber 26 effecting simultaneous leftward movement of the plate 52, the diaphragm 23 and the plate 30 and push rod 29 to rotate the slack adjuster 15 and energize the friction device. During this emergency energization of the friction device, the shaft collar 54 is also moved leftwardly in the counterbore 69 of the driving member 65 into juxtaposition with the abutment flange 64 on the driving member interior end 66. As previously mentioned, the stroking distance between the collar 54 and flange 64 is predeterminately greater than the stroking distance of the piston 43 to preclude shock loading of the threaded engagement between the release member 65 and the cylindrical extension 57 in order to obviate thread stripping.

With the component parts of the system 1 and actuating cylinder 9 positioned as above described, the friction device is energized to effect a vehicle emergency stop. Often such vehicle emergency stops occur at inopportune times and/or place the vehicle in dangerous positions with regard to other vehicles on the road; therefore, after such emergency stops occur, it is often advantageous and desirable to move the vehicle to a less dangerous position in order to correct the failure of the system 1 and subsequently reestablish normal operating conditions wherein the system fluid pressure is greater than the predetermined amount.

The emergency release means 56 is provided to release the springs 46 and 47 and overcome the forces thereof which energize the friction device under emergency conditions, as hereinafter described. A manual force is applied in the hexagonally-shaped head 70 of the driving member 65, and the threaded engagement between the driving member 65 and cylinder 57 effects rightward movement of said driving member relative said cylinder in response to the manually applied force. This rightward movement initially overcomes the locking engagement between the driving member head 70 and the cylinder exterior end 60 effected by the lockwasher 71 and moves the abutment flange 64 on the driving member interior end 66 into abutting engagement with the shaft collar 54. After the driving member abutment flange 64 is abuttingly engaged with the shaft collar 54, further rightward movement of the driving member in response to the manually applied force effects concert rightward movement of the power piston 43 and shaft 49 against the compressive forces of emergency springs 46 and 47. In view of the above, it is apparent that the compressive forces of springs 46 and 47 are redirected through the emergency piston 43 and shaft 49 to the driving member 65 and therefrom to the cylinder 57 via the threaded engagement between said driving member and cylinder. When the driving member 65, the emergency piston 43 and the shaft 49 are concertly moved in a rightward direction for a predetermined distance, the compressive forces of the emergency springs 46 and 47 are sufficiently overcome to de-energize the friction device so that the vehicle can be moved to a more advantageous and/or less dangerous position. Of course the compressive force of the return spring 31 effects rightward movement of the component parts associated therewith in follow-up relation with the rightward movement of the working end of the shaft 49 in the actuating chamber 26 to rotate the slack adjuster 15 and effect the de-energization of the friction device, as abovementioned.

If the operator so desires, the reduced fluid pressure in the system 1 can be utilized to make a service application, as previously described, to effect service energization of the friction device under emergency conditions when the emergency release means 56 is actuated to overcome the emergency function of the emergency springs 46 and 47; and in this manner, the vehicle can be controllably moved to a more advantageous and/or less dangerous position to correct the fluid pressure failure in the system 1.

When the fluid pressure failure of the system 1 has been corrected and the fluid pressure in the reservoir 6 is increased to an amount greater than the predetermined amount wherein normal operating conditions are now re-established, the fluid pressure in the emergency chamber 45 of the actuating cylinder 9 is correspondingly increased to re-establish the magnitude of the emergency force. When the magnitude of the emergency force overcomes that of the compressive forces of the springs 46 and 47, the emergency piston 43 is moved rightward in the bore 40 against said springs to its original position in abutment with the interior end 58 of the cylinder 57, and the driving member 65 may now be freely returned to its original position in locking and threaded engagement with the cylinder 57.

Of course the operator may initiate the emergency function of the actuating cylinder 9, if he so desires, by "dynamiting" the system 1. To "dynamite" the system 1, the operator merely rotates the charging valve 4 in a clockwise direction (as shown by the arrow in FIG. 1) to align the passage means 10 between the outlet port 8 and the exhaust port 11 thereby exhausting fluid pressure from the emergency chamber 45 of the actuating cylinder 9 through the passage 35 and emergency port 34 into the conduit 7 and therefrom via said outlet port, passage means and exhaust port of the charging valve 4 to the atmosphere. With the emergency chamber 45 vented to atmosphere, the emergency function of the actuating cylinder 9 is initiated, as described herein before, to energize the friction device.

The present actuating cylinder 9 is provided with a service portion 16 having service means 23, 29, and 30 therein responsive to applied service fluid pressure to normally effect a service application of the friction device. An emergency piston 43 is provided in the emergency portion 17 of the actuating cylinder 9 and is slidably mounted in the bore 40 with emergency springs 46 and 47 normally compressed between said emergency piston and the housing endwall 41 when the system fluid pressure is greater than a predetermined amount. The emergency piston 43 also carries an extension or shaft 49 having a working end extending into the service portion 16 normally in abutting engagement with the service means 23, 29 and 30 and an opposed collar end 54 adapted for cooperative engagement with emergency release means 56. When the system fluid pressure falls below the predetermined amount, the springs 46 and 47 move the emergency piston 43 and shaft 49 in a working direction to concertly move the service means 23, 29 and 30 and effect an emergency application of the friction device; and during such an emergency application of the friction device, the driving member 65 of the emergency release means 56 is movable in response to a manually applied force therein to cooperatively engage the collar end 54 of the shaft 49 and move said shaft and the emergency piston 43 against the compressive force of springs 46 and 47 to de-energize the friction device.

It is now apparent that a novel friction device operating mechanism or actuating cylinder meeting the objects set out hereinbefore is provided and that changes and modifications in the disclosure may be made by those skilled in the art without departing from the spirit of the invention as defined by the claims which follow.

What I claim is:

1. A friction device operating mechanism comprising a housing having a bore therein, a cylindrical extension on said housing, piston means slidable in said bore and having a pair of oppositely extending extension means, abutment means threadedly received in said cylindrical extension and having a bore therein, one of said extension means having a working end extending exteriorly of said housing bore, the other of said extensions having an abutment end movable in said abutment means bore, and spring means having a compressive force normally exerted on said piston means in a direction to actuate the working end of said one extension in a work producing direction and to actuate the abutment end of said other extension into juxtaposition with said abutment means, means other than said abutment end and abutment means limiting movement of said piston and extension means relative to said housing and cylindrical extension in response to spring means actuation, said abutment means being movable in response to an applied force in a direction opposite the direction of the compressive force of said spring means on said piston means into engagement with the abutment end of said other extension to move said piston means and the working end of said one extension in a non-work producing direction and positively contain the spring means against actuation of said piston means.

2. A friction device operating mechanism comprising a housing having a bore therein, a cylindrical extension on said housing, a piston slidable in said housing and having a pair of oppositely disposed extension means, one of said extension means extending exteriorly of said housing bore and having a working end thereon, an axially movable release member threadedly received in said cylindrical extension, a first annular flange on said release member, said release member having an axial bore into which extends the other of said extension means, a second annular flange on said other extension movable in said release member bore, said first and second annular flanges normally being spaced apart a predetermined distance, spring means between said housing and said piston normally urging said piston to an operative position to actuate the working end of said one extension means and move the second annular flange on said other extension means a distance less than the predetermined distance from said first annular flange, said release member being axially movable in response to an applied force thereon to initially engage said second annular flange with said first annular flange and subsequently move said piston and extension means against the compressive force of said spring means to de-actuate the working end of said one extension means.

3. A friction device operating mechanism comprising a housing a bore therein, a cylindrical extension on said housing, a threaded bore extending through said cylindrical extension and coaxial with said housing bore, a piston slidable in said housing bore and having a pair of oppositely disposed extensions, one of said piston extensions extending exteriorly of said bore and having a working end thereon, an axially movable release member having opposed ends and a threaded peripheral surface threadedly received in the threaded bore of said cylindrical extension, a bore in said release member coaxial with said housing bore, a force receiving flange integrally formed on said release member adjacent one end thereof and extending radially outwardly therefrom, said force receiving flange being normally engaged with one end of said cylindrical extension exteriorly of said housing, a first annular abutment flange integrally formed adjacent the other end of said release member and extending radially inwardly therefrom, the other of said piston extensions extending coaxially through said first abutment flange into the bore of said release member, a second annular abutment flange formed adjacent the end of said other piston extension and slidable in the bore of said release member, said first and second annular abutment flanges normally being spaced apart a predetermined distance, and spring means circumscribing said cylindrical extension and interposed between said piston and said housing, the compressive force of said spring means urging said piston to move the working end of said one piston extension to an operative position and to move the second abutment flange on said other piston extension toward the first abutment flange a distance less than the predetermined distance, and said release member being threadedly movable in an axial direction relative to said cylindrical extension in response to an applied force on the force receiving end thereof to initially engage said first abutment flange with said second and the working end of said other extension toward an inoperative position and positively contain the spring means against actuation of said piston.

4. In a brake operating system comprising a brake device, a fluid pressure source, an actuating cylinder means for actuating said brake device including a service portion housing having an actuating chamber therein, service brake actuating means in said actuating chamber and operatively connected with said brake device, said service brake actuating means being movable between inoperative and operative positions, means for selectively introducing operator metered fluid pressure from said source into said actuating chamber, said service brake actuating means being movable in response to fluid pressure in said actuating chamber from its inoperative position to its operative position to energize the brake device, the improvement comprising an emergency portion housing releasably secured to said service portion housing and having an emergency chamber therein separate from said actuating chamber, an emergency piston in said emergency chamber and having oppositely disposed extensions, one of said extensions extending exteriorly of said emergency chamber into said actuating chamber and having a working end normally in abutment with said service brake actuating means when said service brake actuating means is in its inoperative position, an emergency release member threadedly received in said emergency portion housing and having a bore positioned in concentric relation with the other of said piston extensions, a first abutment flange on said emergency release member, a second abutment flange on said other extension slidable in the bore of said release member, emergency spring means interposed between said emergency piston and said emergency portion housing, means for introducing fluid pressure from said source into said emergency chamber on one side of said emergency piston, said emergency piston being movable in a non-working direction in response to fluid pressure above a predetermined amount in said emergency chamber to compress said spring means wherein the working end of said one extension is positioned in an inoperative position and the second abutment flange on said other extension is positioned a predetermined distance from the first abutment flange, said spring means being expansible to move said emergency piston in a working direction when the fluid pressure in said emergency chamber is reduced below the predetermined amount wherein the working end of said one extension is moved to an operative position to actuate the service brake actuating means and energize the brake device and said second abutment flange of said other extension is moved toward said first abutment flange a distance less than said predetermined distance, and said emergency release member being threadedly movable in said emergency portion housing in an axial direction in response to an applied force thereon to initially move said first abutment flange into abutment with said second abutment flange and subsequently move said emergency piston in a non-working direction against the compressive force of said spring means to move the working end of said one extension to its inoperative position and de-actuate the service brake actuating means to de-energize the brake device and thereby positively contain said spring means against actuation of said emergency piston during disassembly of said service and emergency portion housings.

5. A friction device operating mechanism comprising a housing, abutment means threadedly received in said housing and having a bore therein, resiliently urged means movable in said housing between operative and inoperative positions including a portion movable in said bore for engagement with said abutment means, said portion being movable toward engagement with said abutment means upon movement of said resiliently urged means toward the operative position thereof, and said abutment means being movable in response to an applied force into engagement with said portion to mechanically move said resiliently urged means toward the inoperative position thereof.

References Cited by the Examiner

UNITED STATES PATENTS

| | | | |
|---|---|---|---|
| 1,121,172 | 12/1914 | De Wald | 192—94 |
| 2,185,537 | 1/1940 | Brownlee | 192—94 X |
| 2,754,805 | 7/1956 | Beman | 121—38 |
| 2,757,763 | 8/1956 | Burger | 188—152 |
| 2,854,954 | 10/1958 | Howze | 188—151.11 X |
| 3,101,219 | 8/1963 | Herrera | 303—6 |

ARTHUR L. LA POINT, *Primary Examiner.*

EUGENE G. BOTZ, *Examiner.*

UNITED STATES PATENT OFFICE
CERTIFICATE OF CORRECTION

Patent No. 3,218,796            November 23, 1965

Cyril B. Fites

It is hereby certified that error appears in the above numbered patent requiring correction and that the said Letters Patent should read as corrected below.

Column 7, line 39, after "second" insert -- abutment flange and subsequently move said piston --.

Signed and sealed this 24th day of January 1967.

(SEAL)
Attest:

ERNEST W. SWIDER            EDWARD J. BRENNER
Attesting Officer            Commissioner of Patents